Patented Aug. 28, 1934

1,971,465

UNITED STATES PATENT OFFICE 1,971,465

CATALYST FOR USE IN THE CONTACT METHOD OF MAKING SULPHURIC ACID

Leopoldo G. Salazar, New York, N. Y., assignor to The Calco Chemical Company, Inc., Bound Brook, N. J., a corporation of Delaware No Drawing. Application August 4, 1931, Serial No. 555,073

1 Claim. (Cl. 23—234)

This invention relates to a method of making sulphur trioxide and to a catalyst for use in said method.

In making sulphuric acid by the contact method, sulphur dioxide and oxygen are brought into contact with a catalyst at an elevated temperature. While the most common catalyst for this purpose is platinum, the catalytic action of vanadium in this process has long been recognized, and vanadium has to an increasing extent been used in catalysts for carrying out the method commercially.

I have discovered that the catalytic action of vanadium in causing a reaction between sulphur dioxide gas and oxygen is greatly increased by the presence of the element thallium, and that this element functions as an activator to the catalytic action of vanadium, and serves both to increase the catalytic action throughout the temperature range at which vanadium acts as a catalyst in this reaction, and to extend this temperature range downward to a material extent.

My invention, which is based on this discovery, consists in improving the contact method of making sulphuric acid by using a vanadium catalyst with thallium as a activator; and in a vanadium catalyst containing thallium for use in said method.

A further feature of the invention consists in distributing the vanadium and thallium over a carrier with which these elements do not react chemically, and which has a highly porous structure, so as to provide a contact mass in which all the vanadium and the thallium are in condition to act upon the gases passed through the mass.

I prefer to introduce the thallium in the form of a salt of a strong volatile mineral acid, such as sulphate or nitrate, as the use of such salts gives better conversion than the use of the hydroxide.

I have found that the character and composition of the carrier are of importance in the efficiency of the finished catalyst. I find it desirable that the carrier be highly porous or microporous and consist of substantially pure silica, with or without water of hydration. Diatomite is one of the substances which meets those requirements, and I do not wish to be understood as limiting myself to its use.

While catalytic masses embodying the invention may be made in numerous different ways, I will, for sake of illustration, describe a specific method for making such a mass which I have found satisfactory and effective in practice.

An aqueous solution of vanadyl sulphate is prepared by passing sulfur dioxide gas into a solution of ammonium metavanadate—$NH_4VO_3$—containing a little sulphuric acid, until the vanadate is completely converted into blue vanadyl sulfate. A solution of thallous nitrate—$Tl\ NO_3$—is also prepared. Diatomite chips, previously calcined at about 1000° C. are then immersed in or sprinkled with the solution of the thallous nitrate, till the chips have absorbed the solution to saturation. They are then removed and dried at 110°. The chips are then immersed or sprinkled again and dried, and the process is repeated until the amount of thallous nitrate desired has been absorbed. It is well to have the solution of thallous nitrate of such concentration that two or more impregnations are required. The chips, dried after the final saturation with thallous nitrate, are then immersed or sprinkled with the desired amount of vanadyl sulphate solution, dried and impregnated again. It is well to have the solution of vanadyl sulphate of such concentration that two or more impregnations are required.

After the final drying, it is desirable, though not essential, to heat the catalyst up to about 500° C. in a stream of burner gas, before using the mass.

I have found that the action of thallium as an activator to the catalytic activity increases with an increase in the proportion of thallium present up to the point where the amount of thallium is atomically six times that of the vanadium. The catalysts produced with six atoms of thallium are however active to an extent that is not always required. For many cases, sufficient activity will be obtained with a lower ratio, such as three atoms of thallium to one of vanadium. Or the ratio of six to one may be retained, but proportionately less of each of the components be applied to the carrier.

(1) To prepare a contact mass in which the atomic ratio of thallium to vanadium is 6:1 by the above described method, the proportions of the soluble salts and the carrier used are as follows:

| | Parts |
|---|---|
| Vanadyl sulphate | 1 |
| Thallous nitrate | 9.8 |
| Diatomite chips | 5.2 |

The catalytic mass thus produced has volume efficiency much greater than present commercial vanadium catalysts.

(2) To prepare a contact mass having an atomic ratio of thallium to vanadium of 3:1 by the above described method, the proportions of the soluble salts and the carrier used are as follows:

| | Parts |
|---|---|
| Vanadyl sulphate | 1 |
| Thallous nitrate | 4.9 |
| Diatomite chips | 5.2 |

The catalyst thus obtained is of about equal volume efficiency with the present commercial vanadium catalysts.

(3) To prepare a contact mass, having an atomic ratio of thallium to vanadium of 6:1 and containing substantially less vanadium per unit of volume of mass than the present commercial vanadium catalysts, the proportions of soluble salts and the carrier used in the above described method are as follows:

| | Parts |
|---|---|
| Vanadyl sulphate | 1 |
| Thallous nitrate | 9.8 |
| Diatomite chips | 20.8 |

The catalyst thus produced is equal or superior in volume efficiency to the present commercial vanadium catalysts although it contains much less vanadium per unit of volume of the mass.

In the manufacture of sulphuric acid in accordance with this invention, a mixture containing oxygen and sulphur dioxide gases is passed through a converter charged with the contact mass above described. The heat evolved by the combination of the gases coming in contact with the catalyst is systematically removed during the passage of the gases through the converter, so that the temperature of the gas in contact with the catalyst is reduced to a temperature of about 425° C. as it leaves the catalyst, material conversion taking place at this temperature, and affording a total conversion of 98%.

Comparative tests of the catalytic masses above described and vanadium contact masses precisely similar except for the omission of the thallium show that at all temperatures from 375° to 500° C. the percentage of conversion of $SO_2$ and O into $SO_3$ is greatly increased by the presence of thallium, and that particularly at temperatures below 450° C., at which little conversion is obtained by a mass containing vanadium only, very material conversion is obtained by the mass containing vanadium and thallium.

The invention is by no means limited to catalytic masses prepared in accordance with the specific methods which have been given as illustrations. These methods may readily be modified by the substitution of chemical equivalents, such as the use of other soluble vanadium compounds instead of vanadyl sulphate, or other soluble compounds of thallium instead of the nitrate. Furthermore, although advantage is gained by the use of the sulphate or nitrate of thallium, it is nevertheless true that satisfactory conversion may be obtained if other compounds such as the hydroxide or carbonate are used. Furthermore, it is not essential to apply the vanadium solution and the thallium solution separately. Provided solutions of such compounds of the two elements are chosen as do not precipitate when mixed, the mixed solution may be applied.

What is claimed is:

A catalyst for use in the contact method of making sulphuric acid comprising a vanadium compound and a thallium compound, in which the gram-atoms of thallium are between 3 and 6 times the gram-atoms of vanadium.

LEOPOLDO G. SALAZAR.